INVENTOR.
EVERETT D. GEORGE

July 3, 1956 E. D. GEORGE 2,752,983
SMALL TUBE SPLICER
Filed June 22, 1953 7 Sheets-Sheet 3

INVENTOR.
EVERETT D. GEORGE
BY
R. L. Miller
ATTORNEY

July 3, 1956  E. D. GEORGE  2,752,983
SMALL TUBE SPLICER

Filed June 22, 1953

INVENTOR.
EVERETT D. GEORGE

BY
R. L. Miller
ATTORNEY

July 3, 1956   E. D. GEORGE   2,752,983
SMALL TUBE SPLICER
Filed June 22, 1953   7 Sheets-Sheet 5
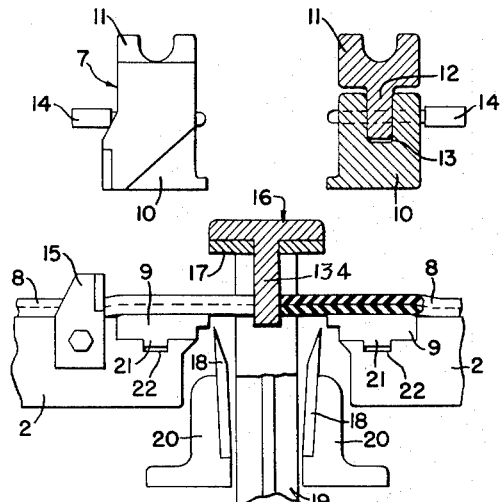
FIG. 7
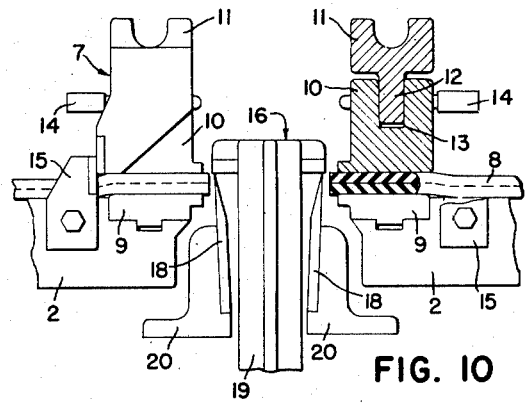
FIG. 10
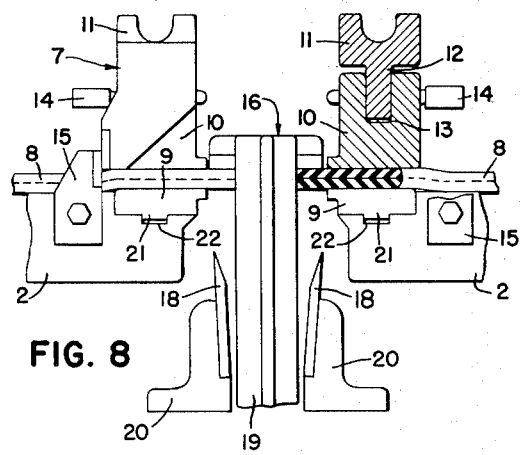
FIG. 8
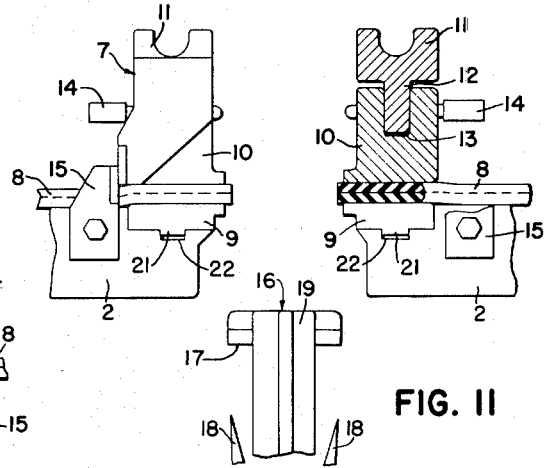
FIG. 11
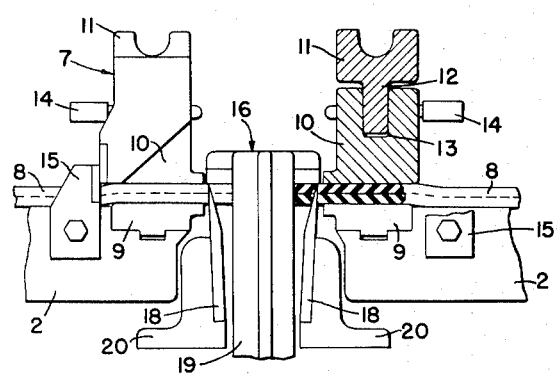
FIG. 9
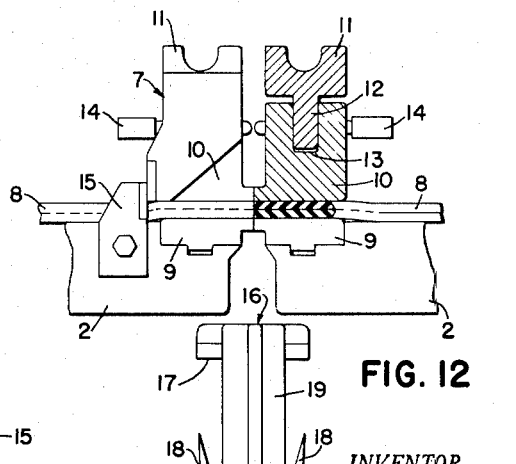
FIG. 12
INVENTOR.
EVERETT D. GEORGE
BY
ATTORNEY July 3, 1956 E. D. GEORGE 2,752,983
SMALL TUBE SPLICER
Filed June 22, 1953 7 Sheets-Sheet 7

INVENTOR.
EVERETT D. GEORGE
BY
R. L. Miller
ATTORNEY

United States Patent Office 2,752,983
Patented July 3, 1956

2,752,983

SMALL TUBE SPLICER

Everett D. George, Cuyahoga Falls, Ohio, assignor, by mesne assignments, to The Goodyear Tire & Rubber Company, a corporation of Ohio Application June 22, 1953, Serial No. 363,251

13 Claims. (Cl. 154—9)

The present invention relates to an improved form of apparatus for splicing the ends of rubber for plastic articles of indeterminate length to form endless bands or tubes. More particularly the invention is concerned with improved means for joining the ends of unvulcanized inner tube stock, treated stock and the like.

Heretofore splicing apparatus of the type shown and described in the Haase Patent 2,024,577 and George Patent 2,541,696 have been quite extensively used and have enjoyed marked commercial success. These patents disclose apparatus having a basic mode of operation which consists of supporting the tube stock in an open loop, placing the ends of the looped tube on carriages which are reciprocal in a horizontal plane, clamping the tube ends to the carriages, cutting the ends of the tubes by means of a suitable cutting device secured to a support disposed within the loop of the tube, and bringing the freshly severed ends into abutting relation. These machines, however, have certain inherent defects or limitations, primarily, due to the fact that the cutting devices are disposed above the carriages and within the loop of the tube and, secondly, the timer for controlling the initiation and duration of the steps in the cycle of operation of the splicer is not variable and, therefore, not adaptable to suit a large variety of tube sizes or compounds.

It is an object of the present invention to correct these defects or limitations, thereby facilitating the production of a large variety of tube sizes on a single machine and particularly to enable tubes of very short length to be readily spliced.

A further object of the present invention is to provide a control means based on sequential timing whereby the total time of each cycle or any step of the cycle of operation of the splicer may be readily adjusted.

A further object is to provide a splicing apparatus which efficiently prevents the dissipation of heat from the cutting device and provides a maximum degree of safety for the operator.

Another object of the present invention is to provide a guide means which enables the operator to accurately space the ends of the tube a constant distance apart so that the length of the spliced tubes is maintained within smaller limits than was heretofore possible.

Other objects and advantages of the present invention will be readily understood as the description of a preferred form of splicing apparatus, illustrated in detail in the acompanying drawings, proceeds.

In the drawings,

Figs. 7 through 12 are front elevation views of the carriages, clamps, knives and anvil, showing the sequence of operation thereof.

Figure 1:
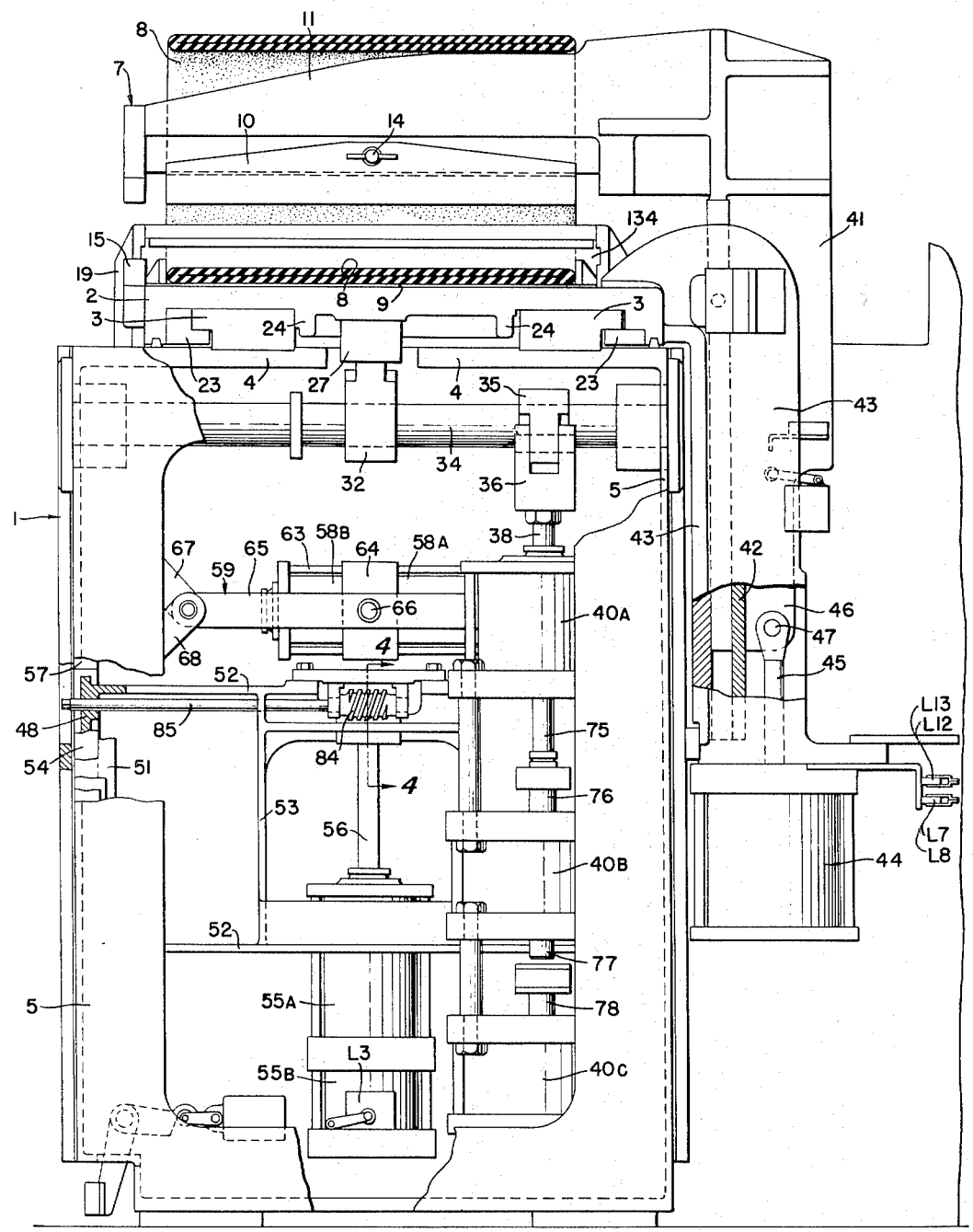
Fig. 1 is a side elevation of a preferred form of splicing apparatus incorporating the teachings of the present invention.

Referring first to Fig. 1 of the drawings, the reference character 1 identifies the butt splicing apparatus generally. The butt splicing apparatus 1 has a pair of slide members or carriages 2 mounted for reciprocable movement in a horizontal plane along the ways 3 on the bed 4 of the frame member 5 of the apparatus. The ways 3 comprise a pair of parallel bars which are secured to the bed 4 as by means of a plurality of cap screws 6 threaded into suitable tapped holes provided in the frame member 5.

The butt splicing apparatus 1 embodies a pair of clamping means 7 for holding the ends of the tube stock 8 securely in position for the trimming and jamming steps of the splicing operation. Each clamping means 7 comprises a clamp 10 and a cooperating guide member 9 which is mounted on the carriage 2 in a manner to be more fully explained hereinafter. The clamps 10 are suspended from the vertical supports 11 which are arranged in such fashion that they may be actuated in both a vertical and a horizontal plane with respect to the bed 4 of the frame member 5 of the butt splicing apparatus 1.

In each case the clamp 10 is secured to the clamp arms 11 by means of a depending flange portion 12 therein (see Fig. 2) which interfits with a bifurcated portion 13 on the clamp 10. A pin 14 extending through the bifurcated portion 13 of the clamp 10 and the depending flange portion 12 of the clamp arms 11 serves to provide a tiltable mounting for each clamp in a direction transversely of the lateral dimension of the tube stock 8. A positioning member 15 is disposed adjacent the outermost end of each of the clamps 10 on the carriages 2. This positioning member 15 serves to prevent displacement of the clamp 10 in a direction longitudinally of the tube stock 8.

Figure 2:
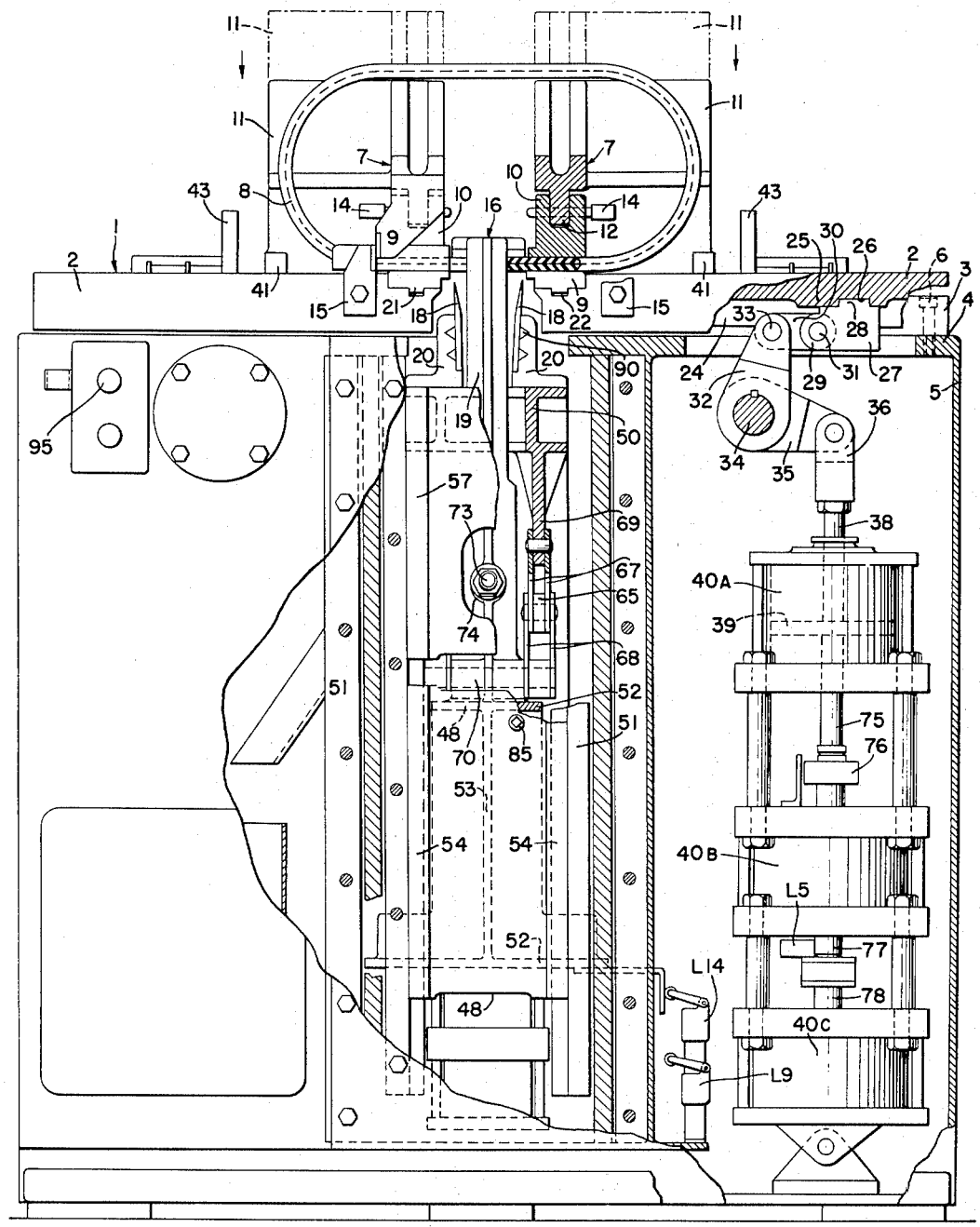
Fig. 2 is a front elevation of the apparatus of Fig. 1.

In certain of the operations of the butt splicing apparatus 1, it is necessary to provide an anvil 16 which is adapted to be positioned between the clamping means 7 for accommodating each of the ends of the tube stock 8 in the manner shown in Fig. 2. The anvil 16 is T-shaped in vertical cross section and provided with cutting surfaces 17 on the underside of the anvil 16 for coaction with the heated cutting edges or knives 18 in removing excess stock from the ends of the tube stock 8 and to provide a fresh tacky surface for joining the ends of the stock in the course of the splicing operation. A suitable actuating means, hereinafter described, is provided for operating the supports 19 for the anvil 16 to raise and lower it into and out of position with respect to the clamping means 7. A suitable means, also hereinafter described, is provided for operating the support 20 on which the knives 18 are mounted.

The guide 9 of each clamping means 7 is advantageously positioned and secured in place on its carriage 2 by means of a key portion 21 which fits into a groove 22 (see Fig. 2) extending laterally of the carriage. The carriage 2 in each case has a stiffening rib 23 disposed directly beneath the position of the guide 9 thereon. This stiffening rib 23 together with a pair of locating ribs 24 arranged in parallel relation to each other are formed integrally with the underside of the carriage 2. The locating ribs 24 serve to cooperate with the ways 3 on the bed 4 of the frame member 5 in the butt splicing apparatus 1 to define a path of travel for the carriages 2 in a horizontal plane toward and away from each other.

A boss portion 25 is formed on the underside of each carriage 2 and has a groove 26 machined thereacross to form a means of locating the hinge block 27 with the key portion 28 thereof fitted into the groove and secured thereto. The hinge block 27 has a bifurcated end portion 29 which is adapted to receive a link 30 secured thereto as by means of a pin 31. The link 30 is similarly attached to an arm 32 as by means of a pin 33.

The arm 32 is fixed to a shaft 34 which is supported by the bearing members (not shown) in a horizontal position extending substantially transversely of the carriage 2 and are suitably secured to the frame member 5 in such fashion that the shaft 34 may be rotated about its longitudinal axis. The shaft 34 (see Fig. 2) also has secured thereto an arm 35 the opposite end of which is fitted into the bifurcated member 36 to which is pivotally secured the piston rod 38 of the piston 39 reciprocal within the pneumatic carriage cylinder 40A.

The clamping arms 11 are respectively supported by a pair of slide members 41 mounted for slidable movement in a vertical plane upon machine slides 42 respectively formed on the vertical supports 43. The supports 43 are secured to or form a part of carriages 2. On the lower end of each vertical support 43 is disposed a pneumatic cylinder 44. The piston rods 45 of the pneumatic cylinders 44 are in turn respectively connected to the bifurcated flange 46 of the slide members 41 by means of pins 47. Thus the actuation of the pneumatic cylinders serves to move the slide members 41 in a vertical path along the slides 42.

Figure 3:
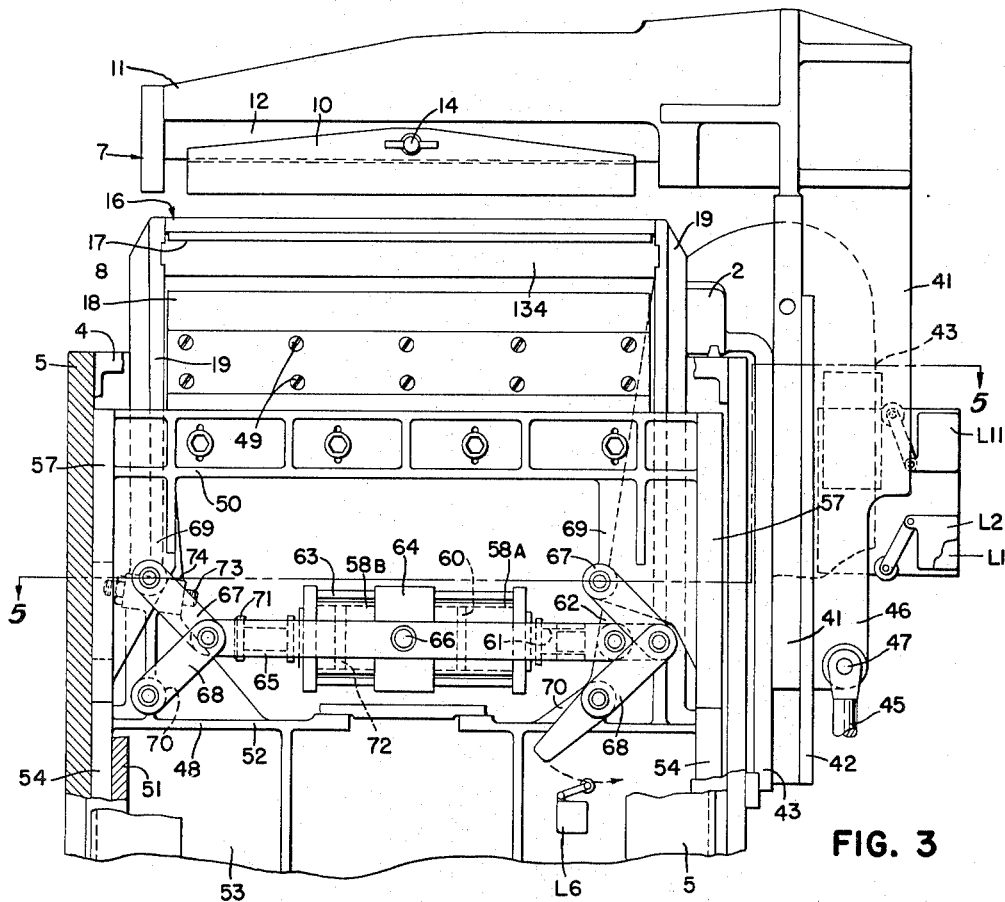
Fig. 3 is a side elevation of a portion of the apparatus of Fig. 1 with parts broken away and showing the apparatus in normal starting position.

The anvil 16 is supported at each end by anvil supports 19 which are secured to a lower sliding frame 48. The cutting knives 18 are secured by machine screws 49 to an upper sliding frame 50. Frames 48 and 50 are mounted for vertical sliding movement in tracks 51 with the upper sliding frame 50 slidable relative to the lower frame 48. The anvil supports 19 project through the upper frame 50 and the transverse distance between the anvil supports 19 is greater than the length of the knives 18. The lower frame 48 has two horizontal transverse platforms 52 connected by webs 53 with vertical slides 54 disposed in each corner thereof, which ride on the tracks 51. The lower frame 48 is actuated by anvil cylinder 55b connected to the upper platform 52 by piston rod 56 and anvil retracting cylinder 55a. The upper frame likewise has integrally formed slides 57 disposed in each corner thereof which ride in tracks 51. In normal starting position the lower edge of the slides 57 of the upper platform rest upon the upper edge of slides 54 of the lower platform, and, as shown in Fig. 3, the cutting edge of the knife 18 and the cutting surface 17 of the anvil 16 are a substantial distance apart. This distance is maintained throughout all of the steps in the operation of the machine, hereinafter described, except the cutting step.

Figure 6:
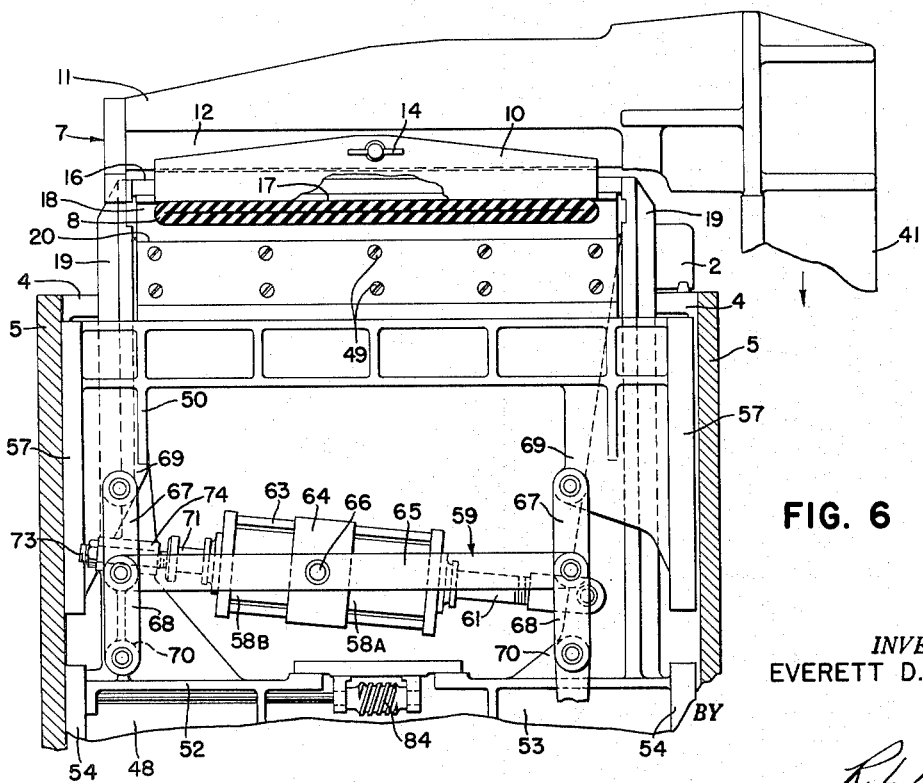
Fig. 6 is a side elevation of the apparatus of Fig. 1 with parts broken away showing the apparatus with the knife in cutting position.

In order to perform the cutting operation the knives 18 are moved upwardly into engagement with the cutting surfaces 17 and the upper frame 50 is in turn moved upwardly relative to the lower frame 48. To accomplish the relative upward movement of the upper frame 50 with respect to the lower frame 48, knife cylinder 58a, knife stop cylinder 58b, and toggle linkage, generally referred to by the numeral 59, operably connecting the cylinders to the upper and lower frames are provided. The knife cylinder 58a is provided with a piston 60 having piston rod 61 connected to an ear or flange 62 formed integrally with the lower frame 48. Cylinders 58a and 58b are secured within a housing 63 having a yoke 64 which is pivotably attached to a pair of links 65 by means of stub pins 66. Each end of the links 65 is pivotably connected to the upper frame 50 by a pair of links 67 and to the lower frame 48 by a pair of links 68. The links 67 are pivotably connected to flanges 69 integrally formed with the upper frame 50 and the links 68 are pivotally attached to the flanges 70 integrally formed with the lower frame 48. It is thus seen that application of air pressure against the left end of the piston 60 will cause the cylinder housing 63 to move relative to the piston and, in turn, the links 65 will actuate the links 67 and 68. Since the links 68 are secured to the lower frame 48, the upper frame 50 will be caused to move upwardly relative to the lower frame resulting in upward movement of the knives 18 relative to the anvil 16, as shown in Fig. 6.

The knife stop cylinder 58b is provided with a piston rod 71 attached to a piston 72 which holds the piston rod in extended position when pressure is introduced into the right end of cylinder 58b. Adjustable stop 73 is supported by an ear 74 secured to the lower frame 48. The piston rod 71 contacts the stop before the upper frame has completed the full extent of its travel, which momentarily halts the upward movement of the frame until the pressure in the right end of cylinder 58b is released. During the momentary halting of the upward movement of the upper frame the carriages 2 are retracted a slight distance from each other and the cut is then completed. A step cut is thus formed so that the upper cut edges of the stock will contact each other before the lower edges in order to provide a reinforced splice on the tread area of the tube.

In order to accomplish the step cut described previously the carriages 2 must be actuated to back away from each other during the momentary halting of the upward movement of the knife. The carriage actuating arm 35, connected to the piston rod 38 of the cylinder 40a is controlled by a positioning cylinder 40b and a back-away cylinder 40c. The cylinder 40b is provided with a piston having an upper rod 76 which contacts the lower piston rod 75 of the carriage cylinder 40a and a lower piston rod 77 which contacts the piston rod 78 of the cylinder 40c. At the beginning of a cycle in the operation of the splicer, pressure is applied, by control means hereinafter described, to the upper end of carriage cylinder 40a and the lower ends of the positioning cylinder 40b and back-away cylinder 40c, so that the ends of the rods 75 and 76 are in abutting relation, but the ends of rods 77 and 78 are maintained a predetermined distance apart. At this time the elements of the splicer are in the position shown in Fig. 7 of the drawings. After the knife has ascended and partially cut through the stock 8, the upward movement is momentarily arrested by the piston rod 71 contacting the adjustable stop 73. This action causes air to be released from the bottom side of the positioning cylinder 40b which permits piston 39 to descend until the piston rods 77 and 78 contact each other. Carriages 2 are thereby caused to back away from each other a slight distance and the cut is then completed. After completion of the cut, air is applied to the upper end of cylinders 40b and 40c which retracts the piston rods 76 and 78 to their lowermost position. After the anvil and knife have been retracted from between the carriages 2 into the position shown in Fig. 11, air is applied to the lower end of the carriage cylinder 40a causing the carriages 2 to move together for the squeeze or butt splice as shown in Fig. 12. Thereafter air is applied to the upper end of cylinder 40a which causes the carriages to retract. The anvil then rises to the position shown in Fig. 7 and air is applied to the lower end of cylinders 40b and 40c. Air pressure then exists on the upper side of cylinder 40a and the lower ends of cylinders 40b and 40c and the apparatus is again in starting position.

Figure 4:
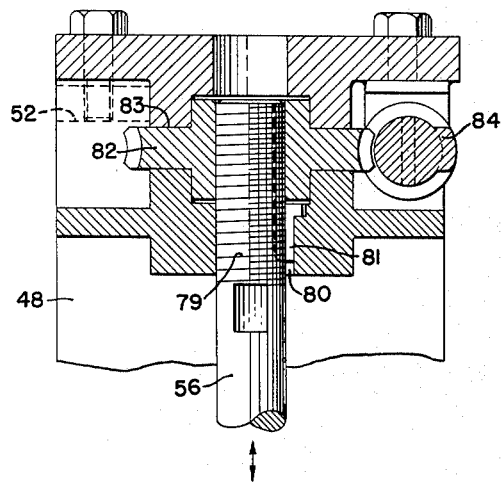
Fig. 4 is a cross-sectional view of the anvil adjusting device taken along the lines 4—4 of Fig. 1.
Figure 5:
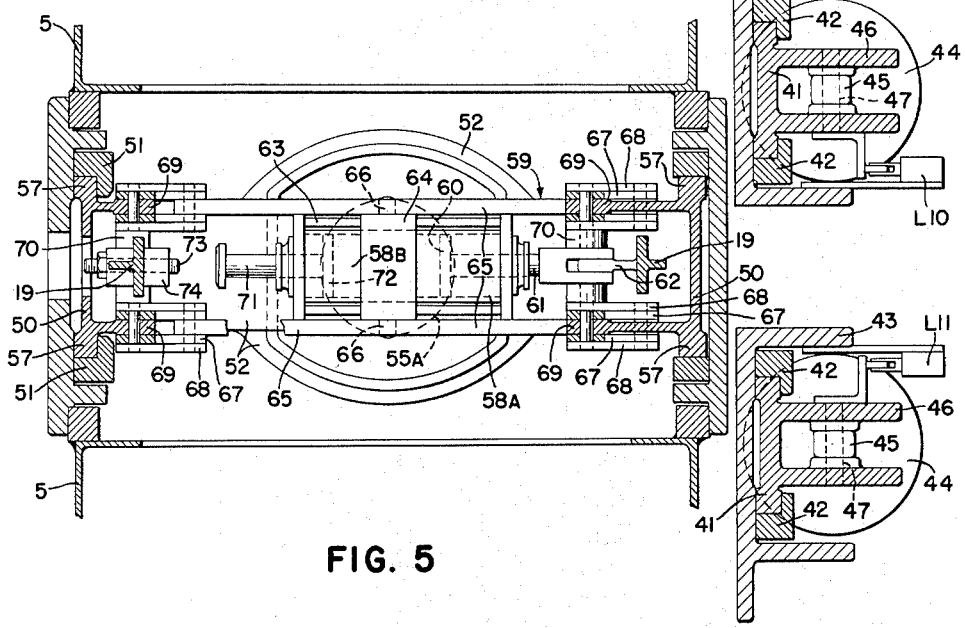
Fig. 5 is a cross-sectional view taken along the lines 5—5 of Fig. 3.

During the cutting operation the cutting surface 17 of the anvil 16 must bear against the stock 8 as shown in Fig. 2. In order that the anvil may accommodate stocks of varying thickness the lower frame 48 is vertically adjustable. Referring to Figs. 1 and 4 of the drawings, the piston rod 56 is provided with threads 79 and is held against rotation by the spline 80 and key 81. Worm wheel 82 is threadedly connected to the piston rod 56 which is supported on the frame by the bearing surface 83. The worm wheel is actuated by screw 84 having a long shank 85 extending to the front of the splicer. Rotation of the screw 84 rotates the worm wheel 82 which in turn causes the lower frame 48 to be moved in an upward or downward direction relative to the rod 56. The upper extremity of the travel of the lower frame 48 is thereby adjustable, and thus, the distance between the cutting surfaces 17 of the anvil 16 and the guides 9 may be varied to accomodate stock of different thicknesses.

Figure 13:
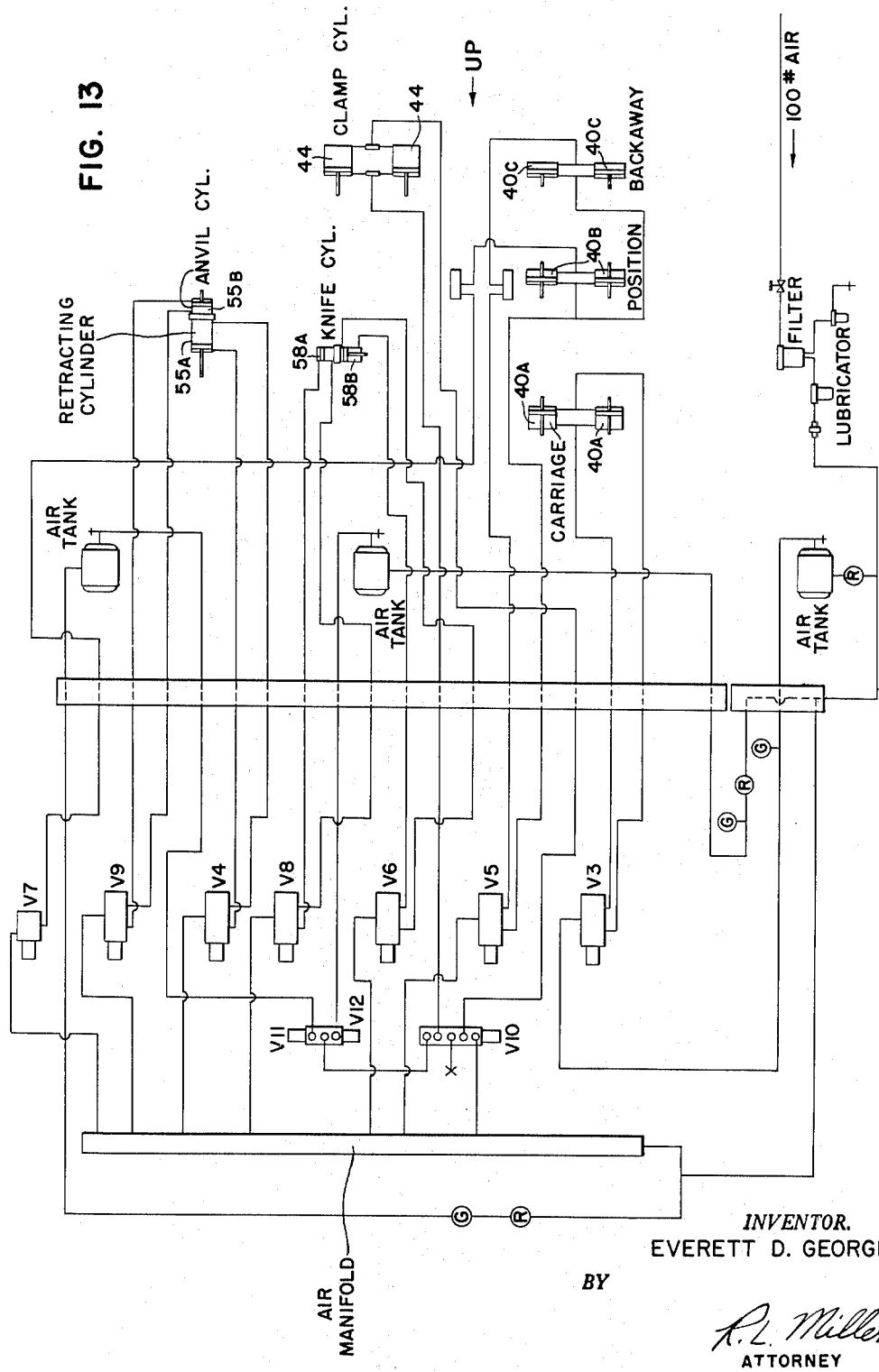
Fig. 13 is a diagrammatic view of the pneumatic piping system.
Figure 14:
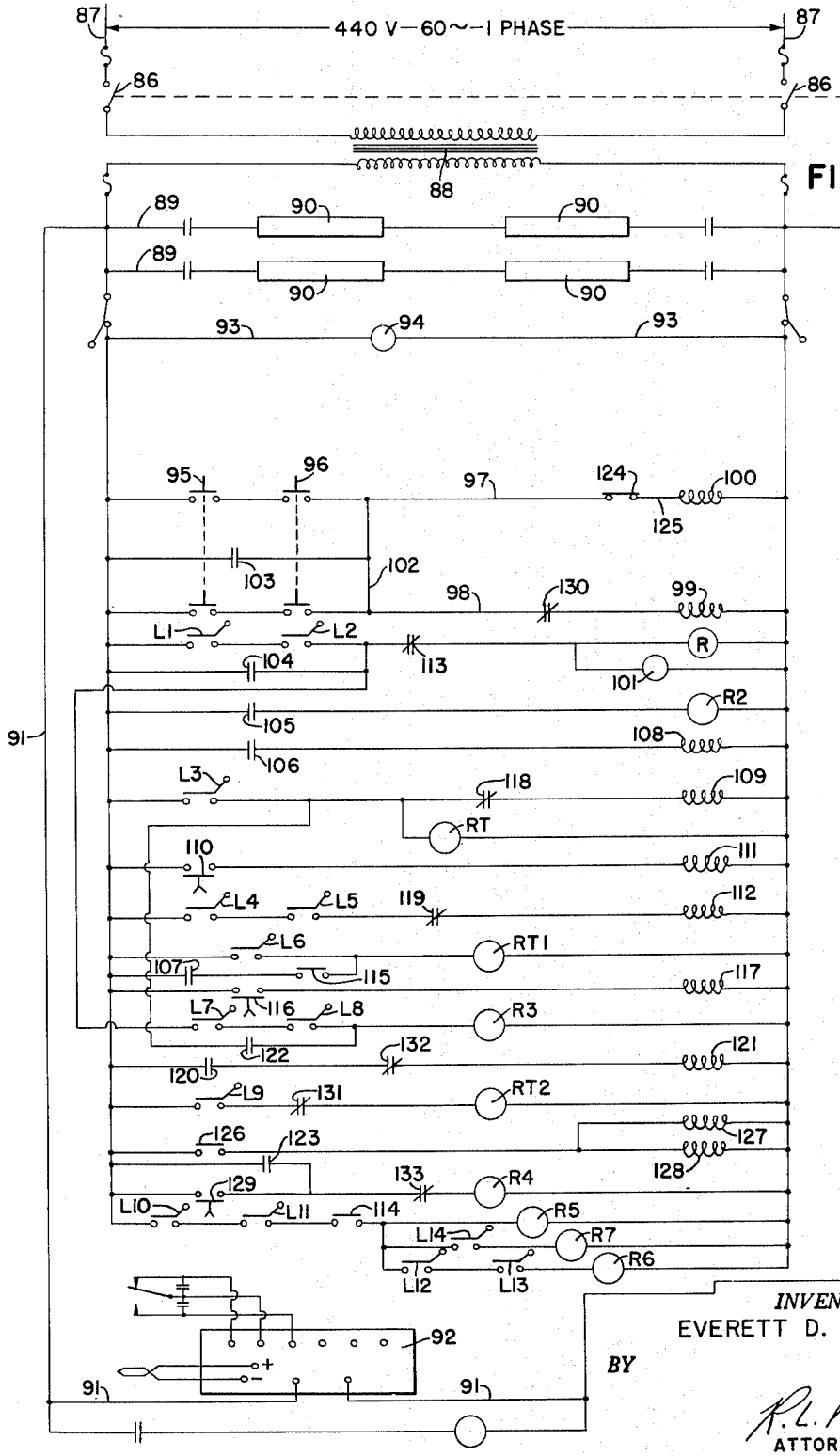
Fig. 14 is a circuit diagram of the electrical control system for the apparatus.

Referring now to the piping diagram of Fig. 13 and the electrical wiring diagram of Fig. 14, it will be noted that the double-pole main switch 86 must first be closed to supply electrical power to the splicing apparatus from power lines 87 through the transformer 88. Conductors 89 supply power to the heaters 90 and each of the knives 18 and conductors 91 are connected to the temperature control unit 92 which maintains the knives at a predetermined operating temperature. Conductors 93 connect the signal light 94 to the main circuit which indicates to the operator that the control circuit is energized.

The splicing apparatus is now in readiness for operation with the several elements of the apparatus in the relationship illustrated in Figs. 1 and 3 of the drawings as previously described. In the normal starting position the anvil is in the extreme up position with air pressure applied to the upper end of the anvil cylinder 55b and to the bottom end of the retracting cylinder 55a. The knives are in the extreme lower position with air pressure applied to the right end of knife cylinder 58a and the right end of the knife stop cylinder 58b. The clamps are in the up position with air on the bottom ends of the clamp cylinders 44, the carriages in starting position with air on the top ends of the carriage cylinders 40a and the bottom ends of the positioning cylinders 40b and the back-away cylinders 40c. At this time all solenoids are de-energized.

As soon as the pre-cut segment of tube stock 8 is in place over the clamp arms 11 (see Fig. 2) with its open ends in position on the guide members 9, the operator presses the buttons 95 and 96 to complete the circuit across the conductors 97 and 98 which energizes the coils 99 and 100 of the solenoid valves V10 and V12 respectively, allowing low air pressure to enter the top end of clamp cylinders 44 causing them to move the clamps downwardly into engagement with the stock. When the clamps 10 have reached their maximum down position, limit switches L1 and L2 are actuated which energizes relay R and a signal light 101 to indicate to the operator that the automatic portion of the cycle has been initiated.

The relay R has three normally opened contacts. Completion of the circuit across conductor 102 by the closing of normally open contact 103 of relay R maintains energization of solenoid valve coils 99 and 100 of solenoid valves V10 and V12. The normally open contact 104 of relay R is also energized and maintains the relay R in closed position. Energization of the normally open contact 105 of relay R energizes relay R2 which has two normally open contacts 106 and 107. Closing of contact 106 energizes coil 108 of the solenoid valve V9 causing air pressure to be admitted to the bottom end of the anvil cylinder 55b which causes the anvil to move downwardly into the position shown in Fig. 3. Closing of contact 107 permits subsequent closing and maintenance of the circuit to RT2.

When the anvil 16 is in down position, limit switch L3 is actuated which energizes the coil 109 to the knife cylinder solenoid valve V8 permitting air pressure to be applied to the left end of the knife cylinder 58a, thus causing the knife to raise for the first part of the step cut. Actuation of the limit switch L3 also energizes time-delay relay RT which closes contacts 114 and 110 the latter of which energizes the coil 111 of the solenoid valve V7. Opening the valve V7 exhausts air from the bottom end of positioning cylinders 40b causing the vices to back away for the step cut. When the vices have retracted for the step cut, limit switches L4 and L5 are actuated which energizes solenoid valve coil 112 permitting air to be applied to the left end of the knife-stop cylinder 58b through the valve V6 so that the knife completes its cut through the tube. When the knives reach the uppermost position, limit switch L6 is actuated and energizes the time-delay relay RT1. The time-delay relay RT1 instantaneously closes the contacts 114 and 115 which permits subsequent energization of relay R5 and maintains energization of the relay RT1. After a short delay, contact 116 of relay RT2 energizes the coil 117 of the solenoid valve V5 permitting air to enter the uppermost end of the carriage back-away cylinders 40c and the carriage positioning cylinders 40b. Since air pressure is on the upper end of cylinder 40a, the carriages are permitted to move to their maximum outer limit as shown in Fig. 10.

When the carriage is in the extreme outer limit, the limit switches L7 and L8 are actuated to close the circuit to relay R3 which opens contact 118 and de-energizes coil 109 to the solenoid valve V8 and permits air pressure to be applied to the right end of the knife cylinder 58a causing the knives to be lowered. Contact 119 of relay R3 opens to de-energize the coil 112 to the solenoid valve V6, allowing air to be applied to the right end of knife-stop cylinder 58b which extends the cylinder rod 71. Contact 120 of relay R3 closes to energize the coil 121 of the solenoid valve V4 permitting air to enter the upper end of retracting cylinder 55a causing the anvil and knife assembly to retract downwardly. Contact 122 of relay R3 maintains energization of the relay R3 through the limit switch L3. When the anvil retracting cylinder is down, limit switch L9 closes to energize time-delay relay RT2. Contact 124 of time-delay relay RT2 then opens to open the circuit across conductor 125 de-energizing coil 100 of the solenoid valve V12. Contact 126 of time-delay relay RT2 is also closed to apply regulated air pressure to the top end of the clamp cylinders by energizing the coils 127 and 128 of the solenoid valves V11 and V3 permitting air to be applied to the bottom end of carriage cylinders 40a to move the carriages toward each other for the butt splice, as shown in Fig. 12. For an interval of approximately 15 seconds the machine is static while the splice is being performed, after which the time-delay relay RT2 closes contact 129 which energizes relay R4. Energization of relay R4 closes contact 123 and opens contact 130 which de-energizes coil 99 of the solenoid valve V10 permitting air to be applied to the bottom end of clamp cylinders 44, causing the clamps to move upwardly into the position shown in Fig. 7. Upward movement of the clamps actuates limit switches L10 and L11 energizing relay R5 thru contact 114. Contact 131 of relay R5 opens to de-energize the time-delay relay RT2 closing contact 124 which energizes the coil 100 of solenoid valve V12. Contact 126 of time-delay relay RT2 then opens to de-energize the coils 128 and 127 of solenoid valve V3 and solenoid valve V11. De-energization of the solenoid valve V3 permits air to be applied to the top end of carriage cylinders 40a which moves the carriages to their extreme outer limit to actuate limit switches L12 and L13 which in turn energizes relay R6. When relay R6 is energized, contact 132 is opened which de-energizes the coil 121 of the solenoid valve V4 permitting air to be applied to the bottom end of retracting cylinder 55a. When the retracting cylinder 55a reaches its uppermost position, limit switch L14 is actuated, energizing relay R7 which opens contact 113 and 133 to de-energize respectively the relay R and relay R4. De-energization of relay R4 closes contact 130 of relay R4 which opens contact 123. De-energization of relay R opens contacts 104 and 105 to de-energize relay R2 which opens contact 106 to de-energize coil 108 of the solenoid valve V9. Air is then permitted to be applied to the upper end of anvil cylinder 55b causing the anvil to move upwardly into the position shown in Fig. 7. Contact 107 of relay R2 opens to de-energize relay RT1 which in turn opens contact 116 and de-energizes the coil 117 of the solenoid valve V5 permitting air to be applied to the bottom end of the back-away cylinders 40c.

During the elevation of the anvil, limit switch L3 is actuated to de-energize relay RT which opens contact 110 to de-energize the coil 111 of the solenoid valve V7 to permit air to be applied to the bottom end of the positioning cylinder 40b. All the cylinders are then in their normal starting position, all the solenoids are de-energized and the splicer is now ready for further operation.

From the foregoing and as shown in Fig. 2 of the drawing, one improvement of the applicant's invention resides in providing a splicing apparatus which may accommodate tube stock of much shorter length than was heretofore possible. It is seen that the anvil 16 and knives 18 both retract radially outwardly from the center of the looped stock. Since the stock need only be looped around the clamping arms 11, tubes having much shorter diameters may be spliced, in addition to those tube sizes which may be accommodated by conventional splicing apparatus.

It is further seen that the anvil which is T-shaped in vertical cross section is provided with a cutting surface 17 on the underside of the head of the T and the shank 134 of the T provides a convenient guide for the operator in spacing the transverse ends of the stock an optimum and constant distance apart. With the elements of the apparatus in the position shown in Fig. 7, the operator places the stock over the clamping arms 11 and brings the ends of the stock to be spliced against the guide 134, thus assuring that a constant amount of excess stock will be removed. Furthermore, it is seen that the knives 18 are inaccessible to the operator during the above operation of placing the stock on the machine, thus assuring that the operator will not inadvertently contact the heated knives.

As previously described the knives 18 are heated in order to provide a fresh tacky surface for joining the ends of the stock in the course of the splicing operation. It is noted that the cutting edges of the knives are disposed in an upward position. Since the heat flow created in the knives by the electrical current tends to rise therein, cutting edges of the knives 18 being upwardly disposed results in more even knife temperatures because of less heat dissipation.

The above described electrical circuit for initiating the actuation of the elements of the splicing apparatus and timing the steps in the cycle is particularly advantageous because it permits the duration of any one step in the cycle to be varied. Tube stock made of one composition and of a particular size may require a longer squeeze than stock made of similar composition but of a different size. The control circuit for several of the operations is provided with a time-delay relay so that the length of those steps in the cycle and the total time of the cycle may be readily adjusted. The time-delay relays RT, RT1 and RT2 may be manually adjusted to vary respectively the time before the backaway operation is initiated, the time before the carriages move outwardly to allow retraction of the anvil and the duration of the squeeze. The electrical control circuit is based on sequence timing whereby the completion of one operation starts the next operation by the actuation of a limit switch.

While certain representative embodiments and details have been shown for the purpose of illustrating the invention, it will be apparent to those skilled in this art that various changes and modifications may be made therein without departing from the spirit or scope of the invention.

I claim:

1. A tube splicing apparatus comprising in combination a frame, slidable means mounted on the frame for supporting the ends of tube stock to be spliced, clamps for holding the ends of the stock in laterally spaced position on the supporting means, cutter means coacting with anvil means for trimming the stock, a track, supporting means for the anvil means, supporting means for the cutter means, said anvil and cutter supporting means being slidably mounted within the track, means for moving the cutter supporting means along the track relative to the anvil supporting means to transversely trim the stock, means for simultaneously retracting the anvil and cutter supporting means out of the plane of the stock supporting means, and means for moving the stock supporting means and clamps toward each other after the retraction operation whereby the cut faces of the stock are forced into abutting engagement to form a splice.

2. A tube splicing apparatus as claimed in claim 1 in which the anvil and cutter supporting means are provided with pivotably connected links and means supported on the links for actuating the links whereby the cutter support is moved relative to the anvil to effectuate the trimming operation.

3. A tube splicing apparatus as claimed in claim 2 in which the anvil support is provided with a stop and means supported by the links adapted to contact the stop for momentarily halting movement of the cutter relative to the anvil during passage of the cutter through the stock.

4. A tube splicing apparatus as claimed in claim 3 in which the means for actuating the links comprises a fluid actuated cylinder supported by the links.

5. A tube splicing apparatus as claimed in claim 4 in which the anvil supporting means is provided with means for adjusting one extremity of the travel of the anvil support.

6. A tube splicing apparatus as claimed in claim 5 in which the adjusting means is remotely controlled.

7. A tube splicing apparatus comprising in combination a frame, slidable means mounted on the frame for supporting the ends of the tube stock to be spliced, clamps mounted for retraction in a vertical direction for holding the ends of the stock in laterally spaced position on the supporting means, a vertically reciprocating cutter, a vertically reciprocating anvil coacting with cutter for trimming the stock and having a surface parallel to and in the same plane as the clamping faces of said clamps during the trimming operation, means for moving the anvil through the plane of the faces of said clamps into position for the trimming operation, means for moving the cutter relative to the anvil to transversely trim the stock, means for retracting the anvil and cutter toward the supporting means and out of the plane of the supporting means, and means for moving the clamps and supporting means toward each other after retraction of the cutter and anvil whereby the cut faces of the stock are forced into abutting engagement to form a splice.

8. A control device for a tube splicing apparatus having a plurality of mechanically movable elements for clamping, cutting, and splicing tube stock, embodying supporting means to support the ends of tube stock to be spliced, clamping means for holding the tube stock in place for the cutting and splicing operations, cutting means for trimming the stock, fluid powered actuating means for moving the clamping means and cutting means relative to the supporting means, fluid powered actuating means for moving the supporting means toward each other to force the cut faces of the stock into abutting engagement to form a splice, electrically actuated valves respectively opened in sequence to control fluid to the actuating means, said control device comprising an electrical control circuit, mechanically operated switches to initially energize the control circuit and the valve controlling fluid to the clamp actuating means, a limit switch actuated by the movement of the clamp actuating means for energizing the valve controlling fluid to the cutter actuating means, a limit switch actuated by the movement of the cutter for energizing the valve controlling fluid to the support actuating means, whereby movement of each element in the sequence of operations of the apparatus is initiated by completion of the preceding operation.

9. A control device for a tube splicing apparatus as claimed in claim 8 in which a variable time relay is provided in the circuit for controlling the duration of the splicing step.

10. A control device for a tube splicing apparatus having a plurality of mechanically movable elements for clamping, cutting and splicing tube stock, embodying supporting means to support the ends of tube stock to be spliced, clamping means for holding the tube stock in place for the cutting and splicing operations, cutting means for trimming the stock, fluid powered actuating means for moving the clamping means and cutting means relative to the supporting means, fluid powered actuating means for moving the supporting means toward each other to force the cut faces of the stock into abutting engagement to form a splice, electrically actuated valves respectively opened in sequence to control fluid to the actuating means, said control device comprising an electrical control circuit, manually operated switches to initially energize the control circuit and the valve controlling fluid to power the clamp actutaing means, limit switches respectively actuated in sequence by subsequent movement of the clamping means, cutting means and supporting means, a relay connected in series to each limit switch and the respective electrically actuated valve, said relays energized sequentially by said limit switches and a variable time relay for controlling the duration of the splicing step in the sequence of operations of the apparatus.

11. A tube splicing apparatus comprising in combination a frame, means on the frame for supporting tube stock in an open loop, means for clamping the ends of the stock in laterally spaced position with the ends projecting therefrom, cutting means coacting with anvil means for transversely trimming the projecting ends of said stock, means for retracting the anvil and cutter means in the same direction and away from the center of the loop after the stock is trimmed, and means for moving the supporting means toward each other after the retraction of said anvil and cutter means whereby the cut faces of the stock are forced into abutting engagement to form a splice.

12. A tube splicing machine as claimed in claim 11 having means disposed between the transverse faces of the uncut stock for longitudinally spacing the transverse faces of the uncut stock a fixed distance from the plane of said cutters prior to clamping the ends of the stock.

13. An apparatus as claimed in claim 12 in which said spacing means is secured to said anvil means.

References Cited in the file of this patent

UNITED STATES PATENTS

| Number | Name | Date |
| --- | --- | --- |
| 377,780 | Sagendorph | Feb. 14, 1888 |
| 737,230 | Hatton | Aug. 25, 1903 |
| 1,260,314 | Bryant | Mar. 26, 1918 |
| 1,957,711 | Heyman | May 8, 1934 |
| 2,072,106 | Fitzimmons | Mar. 2, 1937 |
| 2,208,966 | Eickman | July 23, 1940 |
| 2,483,511 | Vickers | Oct. 4, 1949 |
| 2,516,602 | Snyder | July 25, 1950 |
| 2,561,019 | George | July 17, 1951 |
| 2,633,195 | Rupp | Mar. 31, 1953 |
| 2,660,216 | Clayton et al. | Nov. 25, 1953 |